United States Patent [19]

Rosenfeld

[11] Patent Number: 4,959,445

[45] Date of Patent: Sep. 25, 1990

[54] PREPARATION OF GRAY TO BLUE AROMATIC POLYESTERS BY INCORPORATION OF COBALT INTO THE CATALYST SYSTEM

[75] Inventor: Jerold C. Rosenfeld, Tonawanda, N.Y.

[73] Assignee: Celanese Corporation, Chatham, N.J.

[21] Appl. No.: 68,163

[22] Filed: Jun. 30, 1987

Related U.S. Application Data

[63] Continuation of Ser. No. 834,283, Feb. 25, 1986, abandoned.

[51] Int. Cl.$^5$ .............................................. C08G 63/181
[52] U.S. Cl. .................................... 528/181; 528/176; 528/180
[58] Field of Search ...................... 528/181, 180, 176

[56] References Cited

U.S. PATENT DOCUMENTS

| | | | |
|---|---|---|---|
| 2,902,469 | 9/1959 | Burkhard | 528/181 |
| 3,697,479 | 10/1972 | Maycock | 528/181 |
| 3,824,213 | 7/1974 | Stackman | 260/47 C |
| 3,948,856 | 4/1976 | Stackman | 260/47 C |
| 4,319,017 | 3/1982 | Kosanovich et al. | 528/176 |
| 4,330,668 | 5/1982 | Hideo et al. | 528/181 |

FOREIGN PATENT DOCUMENTS 1287519 2/1962 France.

OTHER PUBLICATIONS

Chem. Abstracts, vol. 72: 90977n.
Chem. Abstracts, vol. 86: 15623p.

*Primary Examiner*—Harold D. Anderson
*Attorney, Agent, or Firm*—Depaoli & O'Brien

[57] ABSTRACT

This invention relates to imparting gray, blue, or purple tints to aromatic copolyester compounds. This is accomplished through the addition of a cobalt-containing compound such as cobalt carbonate, cobalt acetate, cobalt benzoate, or cobalt phenate to the polyester forming reaction system.

13 Claims, No Drawings

PREPARATION OF GRAY TO BLUE AROMATIC POLYESTERS BY INCORPORATION OF COBALT INTO THE CATALYST SYSTEM

This is a continuation of application Ser. No. 834,283, filed Feb. 25, 1986 now abandoned.

BACKGROUND OF THE INVENTION

This invention relates to preparing gray or blue aromatic polyesters, preferably the reaction product of an aromatic dicarboxylic acid and bisphenol, through the addition of cobalt to the reaction system. Aromatic polyesters by themselves, such as formed by reacting bisphenol-A and terephthalate tend to have a yellowish tint. The addition of cobalt to the reaction system will produce a color of gray, blue, or even purple, depending on the level of cobalt added to the reaction system.

Color enhancement of polyesters is known in the prior art. French patent 1,287,519 discloses new polyesters made of phthalic acids, carbonic acids, and bisphenol. This patent discloses that it is difficult to get a desired coloration of these polyesters. Swiss patent 482,752, also Chemical Abstracts Vol. 72, 90977n, discloses the preparation of polyesters, copolyesters, or copolyether esters by using cobalt ethylene glycolate and/or lead ethylene glycolate. The product is a practically white, light-blue polyester. Japanese patent 50-82801, also Chemical Abstracts Vol. 86, 156232p, discloses a system using a lead benzoate or similar catalyst to make a bisphenol-A-diphenyl terephthalate-neopentyl glycol copolymer or similar polyester. These disclosures do not, however, illustrate the use of cobalt in order to obtain a broader range of color enhancement in the blue-to-gray area.

A persistent problem in the preparation of linear aromatic polyesters from reaction of a bisphenol and an aromatic carboxylic acid has been the undesirable high color in the product, i.e., the tendency of the polyester to develop an undesirable yellow color during the polyesterification. The color is attributed to thermal decomposition of the product polyester and/or the reactants during the reaction which is carried out at high temperatures ranging up to 400° C., or higher, without the use of a diluent.

SUMMARY OF THE INVENTION

The addition of cobalt compounds to a melt transesterification catalyst for the preparation of aromatic polyesters results in a polyester of improved color. Examples of cobalt compounds used are cobalt carbonate, cobalt acetate, cobalt phenate, cobalt di-hydroxybenzoate, and cobalt benzoate.

DETAILED DESCRIPTION OF THE INVENTION

It is the object of the present invention to utilize cobalt-containing compounds in reaction systems for the preparation of aromatic polyesters in order to produce various shades of blue, gray, or sometimes even purple or green colors in the resulting polyesters.

The polyesters can be produced by known transesterification modes of polymerization. In accordance with one well known transesterification process for preparing these polyesters, a difunctional hydroxylic reactant comprising bisphenol (and, optionally, also a minor molar proportion of an aliphatic glycol and/or a monofunctional hydroxy aliphatic compound) is reacted with a diaryl ester of a dicarboxylic acid, e.g., a diphenyl ester of the dicarboxylic acid, to prepare a polyester containing as end groups a hydroxy end group derived from the difunctional hydroxylic reactant and a carboxylate, ester end group corresponding to the ester group of the diaryl ester. When the aforementioned monofunctional alcohol reactant is employed, some of the ester end groups of the polyester are modified to alkyl carboxylate ester end groups wherein the alkyl group is derived from the alcohol.

The present transesterification process is carried out in the presence of an ester-interchange or transesterification catalyst of the type conventionally employed in preparing linear aromatic polyesters from diaryl esters of dicarboxylic acid and bisphenols. Preferably, the catalyst present in the transesterification reaction of the invention is an acidic, neutral or basic catalyst, such classifications being based on the reaction of a conventional acid-base indicator and the catalyst when the latter is dissolved in a polar ionizing solvent such as water.

More preferably, a basic catalyst is employed. Prior to its introduction into the reaction mass, the preferred basic catalyst is preferably converted to liquid form, e.g., by melting or by dissolution in a liquid or normally solid, low melting solvent.

Suitable basic catalysts include the alkali metals, such as lithium, sodium, potassium, rubidium, cesium and francium; and the carbonates, hydroxides, hydrides, borohydrides, phenates, bisphenates (i.e., salt of a bisphenol or bisphenol), carboxylates such as acetate or benzoate, or oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Examples of catalysts are lithium, sodium, potassium, rubidium, cesium and francium metals, potassium or rubidium carbonate, potassium hydroxide, lithium hydride, sodium borohydride, potassium borohydride, calcium acetate, magnesium acetate, aluminum triisopropoxide and triphenyl tin hydroxide.

Phenol is the preferred solvent for the normally solid catalysts. Substituted phenols which can be used include those having the formula

wherein R is alkyl of 1 to 10 carbon atoms, alkoxy of 1 to 10 carbon atoms, aryl of 6 to 10 carbon atoms, chloro, bromo or mixtures thereof, and wherein n is 1 or 2.

Typical solvents include o-benzyl phenol, o-bromo phenol, m-bromo phenol, m-chloro phenol, p-chloro phenol, 2,4-dibromo phenol, 2,6-dichloro phenol, 3,5-dimethoxy phenol, o-ethoxy phenol, m-ethyl phenol, p-ethyl-phenol, o-isopropyl phenol, m-methoxy phenol, m-propyl phenol, p-propyl phenol, and the like.

Other solvents which are particularly useful are of the ether type, for example, tetrahydrofuran and the various glycol ethers, for example, ethylene glycol dimethylether and the like.

Combinations of catalysts and combinations of phenols or phenols and solvents may also be used.

Especially preferred liquid basic catalysts are dissolved in molten, normally solid, low melting organic solvents such as phenol. Especially preferred catalysts providing excellent results are the basic catalysts, rubidium phenoxide, potassium phenoxide, and potassium borophenoxide, each dissolved in molten phenol.

Preferably, also when a basic catalyst is employed, the catalyst is separately introduced concurrently with the aforementioned molten reactants to the polymerization reactor to avoid heating the reactants in the presence of the catalyst prior to onset of the transesterification.

Less preferred catalysts include the metal oxides, metal acetates, titanium and tin compounds. Suitable metal oxides include antimony trioxide, germanium oxide, arsenic trioxide, lead oxide, magnesium oxide, and zinc oxide. Suitable metal acetates include cobalt acetate, zinc acetate, cadmium acetate and manganese acetate. Suitable titanium compounds include the organic titanates such as tetrabutyl titanate and tetraisopropyl titanate. Suitable tin compounds include dibutyloxide, dibutyl tin methoxide and dibutyl tin dilaurate.

In accord with conventional transesterification reaction practice, a catalytically effective amount of the catalyst is employed, for example, about 0.005 to about 2 mole percent or more, preferably about 0.01 to 1 mole percent, based on the moles of bisphenol in accordance with known techniques of transesterification.

The present process can be carried out employing in general reaction conditions which are conventional in this art.

According to conventional practice, the solid reactants are heated above about 100° C., preferably above about 160° C. to melt the reactants. Onset of reaction in the presence of catalyst is generally at a temperature ranging from above about 100° C. to about 275° C., for example, above about 160° C. for reaction of bisphenol A, diphenyl terephthalate and diphenyl isophthalate. The reaction temperature employed is generally above about 100° C. to about 400° C. or higher, preferably above about 175° C. to about 350° C., more preferably about 175° C. to about 330° C. with the reaction temperature being raised gradually during the polymerization.

In the transesterification reaction, the aryl group of the diester is displaced as the corresponding relatively volatile monohydroxy aromatic compound, e.g., phenol, for which provision is made for removal, e.g., by distillation from the reaction mixture during the transesterification. Reaction pressure is generally diminished during the reaction, e.g., from atmospheric pressure to a subatmospheric pressure, e.g., of about 0.1 mm of mercury or lower, to aid in the aforementioned removal of the monohydroxy aromatic compound.

Conventional processes of the transesterification are described in British Patent 924,607 and U.S. Pat. Nos. 3,399,170 and 4,137,278, K. Eise et al, German Preliminary Appl. 2,232,877, published Jan. 16, 1974, and G. Bier, *Polymer* 15. 527-535 (1974), the disclosures of which are incorporated herein by reference.

The cobalt-containing compound is added in trace amounts from 0.5 mole % or less, preferably 0.2 mole % or less, based on the reactants. Preferably, the cobalt compound is dissolved in a solvent such as phenol prior to addition to the polymerization mixture. The addition of the cobalt compound to the initial reactants results in a homogeneous mixture in the end product of polyester and cobalt, thus giving the improved coloration of the polyester.

The following examples will demonstrate the effectiveness of the invention in producing various aromatic polyesters having improved coloration.

EXAMPLE 1

31.8 grams (0.100 mole) of a 75%/25% diphenyl iso- and terephthalate mixture, 22.8 g (0.100 mole) bisphenol-A, and 0.00005 moles of Co(OAc)$_2$.4H$_2$O are each vacuum oven-dried, then charged to glass in a tube phased reactor with stirrer, gas inlet, and receiver for phenol, and an oil jacket. The reactants were heated for 1.5 hours under vacuum for further drying, then heated to 200° C. under a dry nitrogen blanket to melt them. 0.12 cc of

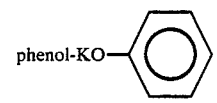

or phenol/potassium phenate solution, (0.00005 moles

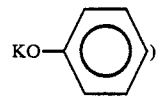

was added via a hot syringe.

The system was then heated to 220° C. and a vacuum was applied gradually and phenol was distilled off with stirring. The temperature in the oil jacket was raised to 240° C. for 30 minutes (vacuum of about 0.2 mm) and then to 300° C. (0.2 mm vacuum) for 45 minutes.

The vacuum was released with dry nitrogen and the polymer was removed and cooled in air. It is clear, light gray, and tough. It also has some small specks in it. Intrinsic Viscosity in 1,1,2,2-tetrachloroethane is determined to be 0.59 dl/g. 6.6 grams of polymer is dissolved in 100 cc (final volume) of high purity CHCl$_2$ and color is measured on a Hunter Colorimeter (5 cm cell). The Yellowness Index is 1.5.

EXAMPLE 2

This example was the same as Example 1 except that no Co(OAc)$_2$.4H$_2$O was added. The polymer is light yellow, clear, and tough. The intrinsic viscosity is 0.55 dl/g and the Yellowness Index is 6.7.

EXAMPLE 3

A solution of

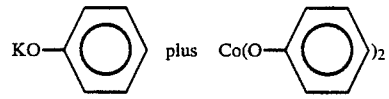

in phenol is prepared in phenol by heating K$_2$CO$_3$ plus CoCO$_3$ in phenol under a nitrogen blanket at about 150° C. for several hours. The ratio of K/Co is 4:1 in the solution.

A polymer is prepared as in Example 1 but the catalyst is 0.12 cc of the solution above-mentioned containing 0.00005 moles

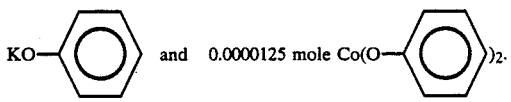

The polymer is clear, tough, and almost colorless. No dark specks are visible. Its appearance is excellent.

EXAMPLE 4

This was a repeat of Example 1, except that, for unknown reasons, a bluish-purple polymer was formed with an Intrinsic Viscosity of 0.51 dl/g and a Yellowness Index of 2.7.

The above examples show that the addition of cobalt compounds in trace amounts have a significant effect on the coloration of aromatic copolyester compounds, creating attractive shades of gray, blue, or purple as compared to the typical yellow tints of the polyesters.

What is claimed is:

1. In a method of preparing aromatic polyesters from a molten mixture comprising an aromatic dicarboxylic acid diester and a bisphenol by melt transesterification in the presence of an alkali metal-containing transesterification catalyst, the improvement which comprises adding a trace amount of a cobalt-containing compound to the molten mixture in addition to said catalyst and recovering a polyester of improved color.

2. The method of claim 1, wherein the cobalt-containing compound is selected from the group consisting of $CoCO_3$, cobalt acetate, cobalt phenate, and cobalt benzoate.

3. The method of claim 1 wherein the cobalt-containing compound is added in amounts of 0.5 mole % or less based on the reactants.

4. The method of claim 3 wherein the cobalt-containing compound is added in amounts of 0.2 mole % or less.

5. The method of claim 1 wherein the cobalt-containing compound is dissolved in a solvent prior to addition to said reaction system.

6. The method of claim 5 wherein said solvent is phenol.

7. The method of claim 1, wherein said catalyst is an alkali metal phenate.

8. The method of claim 7 wherein said alkali metal phenate is dissolved in phenol.

9. The method of claim 7 wherein said alkali metal phenate is potassium phenate.

10. The method of claim 1, wherein said aromatic dicarboxylic acid diester is selected from the group consisting of the diester of terephthalic acid, isophthalic acid, and mixtures thereof.

11. The method of claim 10 wherein said diester is the diphenyl ester.

12. A polyester formed by the method of claim 1.

13. A polyester formed by the method of claim 10.

* * * * *